US012666384B2

(12) United States Patent
Li et al.

(10) Patent No.: US 12,666,384 B2
(45) Date of Patent: Jun. 23, 2026

(54) METHOD, APPARATUS AND DEVICE FOR LOCATION SERVICE PROCESSING, AND MEDIUM

(71) Applicant: DATANG MOBILE COMMUNICATIONS EQUIPMENT CO., LTD., Beijing (CN)

(72) Inventors: Jianxiang Li, Beijing (CN); Haiyang Quan, Beijing (CN); Jing Fu, Beijing (CN); Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 851 days.

(21) Appl. No.: 17/801,232

(22) PCT Filed: Jan. 6, 2021

(86) PCT No.: PCT/CN2021/070460
§ 371 (c)(1),
(2) Date: Aug. 19, 2022

(87) PCT Pub. No.: WO2021/164450
PCT Pub. Date: Aug. 26, 2021

(65) Prior Publication Data
US 2022/0417887 A1    Dec. 29, 2022

(30) Foreign Application Priority Data
Feb. 21, 2020    (CN) .......................... 202010108939.5

(51) Int. Cl.
*H04W 64/00*        (2009.01)
*H04W 24/10*        (2009.01)
(52) U.S. Cl.
CPC ........... *H04W 64/00* (2013.01); *H04W 24/10* (2013.01)

(58) Field of Classification Search
CPC . H04W 64/00; H04W 36/0022; H04W 4/029; H04W 84/12; H04W 36/0011;
(Continued)

(56) References Cited

U.S. PATENT DOCUMENTS

| | | | | |
|---|---|---|---|---|
| 11,937,273 B2 * | 3/2024 | Hong | .................... | H04W 72/20 |
| 11,956,760 B2 * | 4/2024 | Baek | ................. | H04W 28/0236 |

(Continued)

FOREIGN PATENT DOCUMENTS

| | | |
|---|---|---|
| CN | 105792115 A | 7/2016 |
| CN | 110121892 A | 8/2019 |

(Continued)

OTHER PUBLICATIONS

International Search Report for PCT/CN2021/070460, issued on Mar. 29, 2021, and its English Translation provided by WIPO.

(Continued)

*Primary Examiner* — Joseph Arevalo
(74) *Attorney, Agent, or Firm* — Ladas & Parry, LLP

(57)    ABSTRACT

The present disclosure relates to a method, an apparatus and a device for location service processing, and a medium. The method includes: after receiving a location service request, the location management function sending a QoS index requirement containing integrity to a terminal through a positioning protocol; the terminal performing auxiliary measurement function and integrity auxiliary monitoring according to the index requirement, and returning a measurement value to the location management function; and the location management function performing location estimation and integrity estimation according to the returned measurement value.

16 Claims, 3 Drawing Sheets

(58) Field of Classification Search

CPC . H04W 36/00226; H04W 36/12; H04W 4/20; H04W 88/18; H04W 24/10
USPC ..... 455/456.1, 450, 456.3, 75, 456.2, 456.6, 455/440, 422.1, 431, 444, 433, 413, 410, 455/419, 414.1

See application file for complete search history.

(56) References Cited

U.S. PATENT DOCUMENTS

| | | | | |
|---|---|---|---|---|
| 12,035,243 | B2 * | 7/2024 | Park | H04W 76/28 |
| 12,082,194 | B2 * | 9/2024 | Park | H04L 5/00 |
| 12,095,566 | B2 * | 9/2024 | Hwang | H04L 1/1812 |
| 12,108,400 | B2 * | 10/2024 | Back | H04W 72/20 |
| 2008/0162637 | A1 * | 7/2008 | Adamczyk | H04L 51/043 |
| | | | | 709/204 |
| 2018/0199160 | A1 | 7/2018 | Edge | |
| 2018/0343635 | A1 | 11/2018 | Edge et al. | |
| 2019/0053010 | A1 * | 2/2019 | Edge | H04W 4/029 |
| 2020/0280398 | A1 * | 9/2020 | Hwang | H04L 1/1887 |
| 2022/0007150 | A1 * | 1/2022 | Edge | H04W 64/00 |
| 2022/0167209 | A1 * | 5/2022 | Baek | H04W 28/02 |
| 2022/0183057 | A1 * | 6/2022 | Baek | H04W 4/025 |
| 2022/0322324 | A1 * | 10/2022 | Park | H04L 1/00 |
| 2022/0322342 | A1 * | 10/2022 | Hong | H04W 72/0446 |

FOREIGN PATENT DOCUMENTS

| | | | |
|---|---|---|---|
| WO | 2018217323 | A1 | 11/2018 |
| WO | 2022005724 | A1 | 1/2022 |

OTHER PUBLICATIONS

Written Opinion for PCT/CN2021/070460, issued on Mar. 29, 2021, and its English Translation provided by WIPO.

International Preliminary Amendment on Patentability PCT/CN2021/070460, issued on Aug. 23, 2022, and its English Translation provided by WIPO.

"Technical Specification Group Radio Access Network; NG Radio Access Network (NG-RAN); Stage 2 functional specification of User Equipment (UE) positioning in NG-RAN (Release 15)," 3GPP TS 38.305 V15.3.0, Technical Specification Group Radio Access Network, Apr. 9, 2019, all pages.

"3rd Generation Partnership Project; Technical Specification Group Radio Access Network; LTE Positioning Protocol (LPP) (Release 15)", 3GPP TS 37.355 V15.0.0 (Dec. 2019).

"Satellite Earth Stations and Systems (SES); GNSS based location systems; Part 4: Requirements for location data exchange protocols [release 1.2]," ETSI TS 103 246-4 V2.1.2 (Oct. 2016).

Extended European Search Report for the corresponding European Patent Application No. 21756543.1 issued by the European Patent Office on Dec. 4, 2023.

"Views on Rel-17 Positioning Enhancements," 3GPP TSG RAN Meeting #85, Newport Beach, CA, USA, Sep. 16-20, 2019, Agenda Item: 8.1.9 Positioning, Document for Discussion, Source: Swift Navigation RP-191919.

"Motivation Rel-17 Positioning Integrity," Swift Navigation, Deutsche Telekom, 3GPP TSG RAN #86, Sitges, Spain, Dec. 9-12, 2019, Agenda Item: 9.1.2, RP-192750.

* cited by examiner

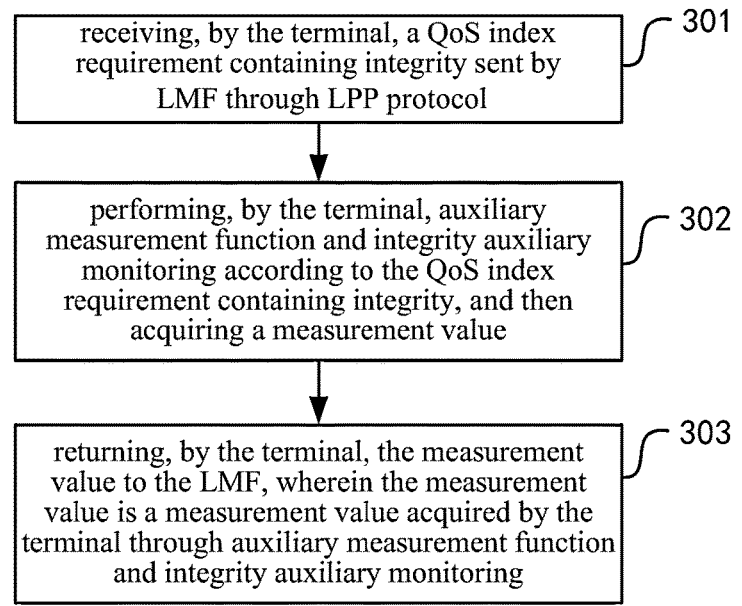

receiving, by the terminal, a QoS index requirement containing integrity sent by LMF through LPP protocol ⌐ 301 performing, by the terminal, auxiliary measurement function and integrity auxiliary monitoring according to the QoS index requirement containing integrity, and then acquiring a measurement value ⌐ 302 returning, by the terminal, the measurement value to the LMF, wherein the measurement value is a measurement value acquired by the terminal through auxiliary measurement function and integrity auxiliary monitoring ⌐ 303

Fig. 3

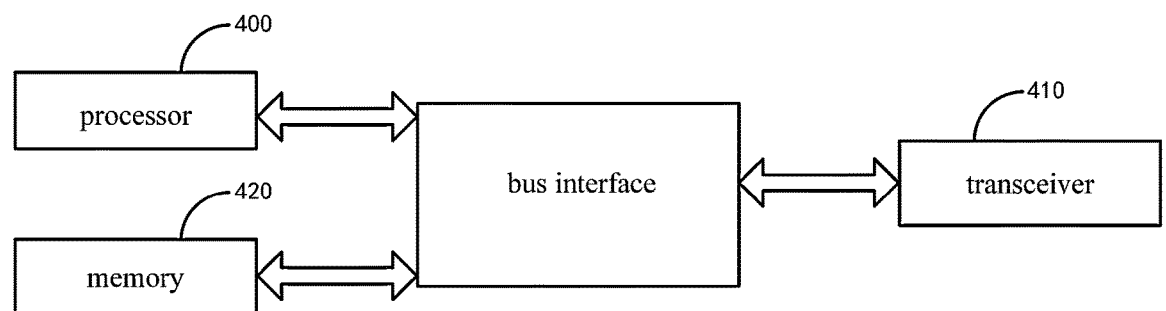

Fig. 4

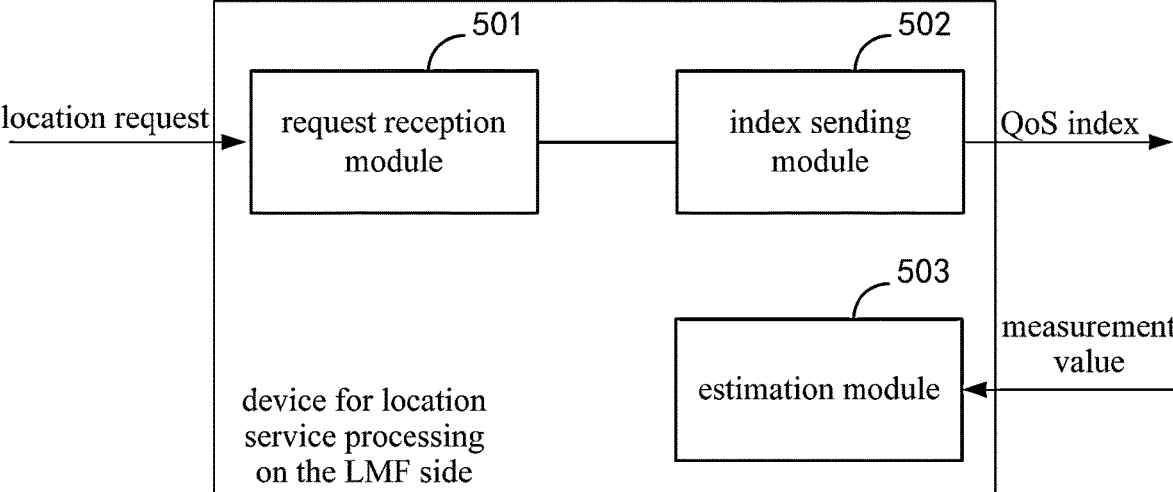

Fig. 5

METHOD, APPARATUS AND DEVICE FOR LOCATION SERVICE PROCESSING, AND MEDIUM

CROSS-REFERENCE TO RELATED APPLICATIONS

This application is the U.S. national phase of PCT Application No. PCT/CN2021/070460 filed on Jan. 6, 2021 which claims priority to Chinese Patent Application No. 202010108939.5 filed on Feb. 21, 2020, the disclosures of which are incorporated in their entireties by reference herein.

TECHNICAL FIELD

The present disclosure relates to the field of wireless communication technology, and in particular to a method, an apparatus and a device for location service processing, and a medium.

BACKGROUND

The existing location mechanisms only meet the requirement of the positioning accuracy, that is, the location services only support satisfying the positioning accuracy within a certain confidence interval.

The disadvantage of the related art is that the existing location services cannot meet higher demands and cannot fully guarantee the safety of users.

For example, the 5th Generation (5G) communication system is oriented to vertical industries, and the location services based on mobile communication networks will be used in scenarios such as autonomous driving and industrial Internet of Things. In these scenarios, there are not only the requirement for positioning accuracy, but also further requirement for the range of location error, and the related art cannot meet such requirements.

SUMMARY

The present disclosure provides a method, an apparatus and a device for location service processing, and a medium, to solve the problem of how to set and feedback to meet the integrity QoS index requirement.

An embodiment of the present disclosure provides a method for location service processing including:

LMF receiving a location service request;

the LMF sending a QoS index requirement containing integrity to a terminal through LPP protocol; and the LMF performing location estimation and integrity estimation according to a measurement value returned by the terminal, wherein the measurement value is a measurement value acquired by the terminal through auxiliary measurement function and integrity auxiliary monitoring.

In some optional embodiments, the QoS index requirement containing integrity is carried by LPP signaling RequestLocationInformation.

In some optional embodiments, the measurement value returned by the terminal is carried by LPP signaling ProvideLocationInformation.

In some optional embodiments, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity includes one or a combination of following information:

integrity risk requirement;

horizontal location alert limit;

vertical location alert limit;

horizontal location alert valid time;

vertical location alert valid time; and reliability requirement indication.

In some optional embodiments, the QoS index requirement containing integrity is carried by a first message, and the measurement value returned by the terminal is carried by a second message.

An embodiment of the present disclosure provides a method for location service processing including:

a terminal receiving a QoS index requirement containing integrity sent by LMF through LPP protocol;

the terminal performing auxiliary measurement function and integrity auxiliary monitoring according to the QoS index requirement containing integrity, and then acquiring a measurement value; and the terminal returning the measurement value to the LMF, wherein the measurement value is a measurement value acquired by the terminal through auxiliary measurement function and integrity auxiliary monitoring.

In some optional embodiments, the QoS index requirement containing integrity is carried by LPP signaling RequestLocationInformation.

In some optional embodiments, the measurement value returned by the terminal is carried by LPP signaling ProvideLocationInformation.

In some optional embodiments, the QoS index requirement containing integrity is carried by a first message, and the measurement value returned by the terminal is carried by a second message.

In some optional embodiments, in a case that the measurement value acquired by the terminal is unreliable, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity includes one or a combination of following information:

integrity risk requirement;

horizontal location alert limit;

vertical location alert limit;

horizontal location alert valid time;

vertical location alert valid time; and reliability requirement indication.

In some optional embodiments, in a case that the terminal supports a UE-Assisted capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; and/or, in a case that the terminal supports a UE-based capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value.

An embodiment of the present disclosure provides an LMF including:

a processor configured to read a program in a memory and execute following processes:

receiving a location service request;

sending a QoS index requirement containing integrity to a terminal through LPP protocol; and performing location estimation and integrity estimation according to a measurement value returned by the terminal, wherein the measurement value is a measurement value acquired by the terminal through auxiliary measurement function and integrity auxiliary monitoring; and a transceiver configured to receive and send data under control of the processor.

In some optional embodiments, the QoS index requirement containing integrity is carried by LPP signaling RequestLocationInformation.

In some optional embodiments, the measurement value returned by the terminal is carried by LPP signaling ProvideLocationInformation.

In some optional embodiments, the QoS index requirement containing integrity is carried by a first message, and the measurement value returned by the terminal is carried by a second message.

In some optional embodiments, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity includes one or a combination of following information:

integrity risk requirement;

horizontal location alert limit;

vertical location alert limit;

horizontal location alert valid time;

vertical location alert valid time; and reliability requirement indication.

An embodiment of the present disclosure provides a device for location service processing including:

a request reception module configured to receive a location service request;

an index sending module configured to send a QoS index requirement containing integrity to a terminal through LPP protocol;

an estimation module configured to perform location estimation and integrity estimation according to a measurement value returned by the terminal, wherein the measurement value is a measurement value acquired by the terminal through auxiliary measurement function and integrity auxiliary monitoring.

An embodiment of the present disclosure provides a terminal including:

a processor configured to read a program in a memory and execute following processes:

receiving a QoS index requirement containing integrity sent by LMF through LPP protocol;

performing auxiliary measurement function and integrity auxiliary monitoring according to the QoS index requirement containing integrity, and then acquiring a measurement value; and returning the measurement value to the LMF, wherein the measurement value is a measurement value acquired by the terminal through auxiliary measurement function and integrity auxiliary monitoring; and a transceiver configured to receive and send data under control of the processor.

In some optional embodiments, the QoS index requirement containing integrity is carried by LPP signaling RequestLocationInformation.

In some optional embodiments, the measurement value returned by the terminal is carried by LPP signaling ProvideLocationInformation.

In some optional embodiments, the QoS index requirement containing integrity is carried by a first message, and the measurement value returned by the terminal is carried by a second message.

In some optional embodiments, in a case that the measurement value acquired by the terminal is unreliable, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity includes one or a combination of following information:

integrity risk requirement;

horizontal location alert limit;

vertical location alert limit;

horizontal location alert valid time;

vertical location alert valid time; and reliability requirement indication.

In some optional embodiments, in a case that the terminal supports a UE-Assisted capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; and/or, in a case that the terminal supports a UE-based capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value.

An embodiment of the present disclosure provides a device for location service processing including:

an index reception module configured to receive a QoS index requirement containing integrity sent by LMF through LPP protocol;

a measurement module configured to perform auxiliary measurement function and integrity auxiliary monitoring according to the QoS index requirement containing integrity, and then acquiring a measurement value; and a measurement value returning module configured to return the measurement value to the LMF, wherein the measurement value is a measurement value acquired by the terminal through auxiliary measurement function and integrity auxiliary monitoring.

An embodiment of the present disclosure provides a computer readable storage medium, storing a program for performing any of the aforementioned methods.

BRIEF DESCRIPTION OF THE DRAWINGS

The accompanying drawings described herein being a part of the specification are to provide a further understanding of the present disclosure. The exemplary embodiments of the present disclosure and their descriptions are used to explain the present disclosure and do not constitute an improper limitation of the present disclosure. In the drawings:

FIG. 3 is a schematic flowchart of implementing a method for location service processing on a terminal side in an embodiment of the present disclosure;

FIG. 4 is a schematic structural diagram of LMF in an embodiment of the present disclosure;

FIG. 5 is a schematic structural diagram of a device for location service processing on an LMF side in an embodiment of the present disclosure;

DETAILED DESCRIPTION

During the invention process, the inventor noticed that: the following briefly describes the definition of the existing QoS (Quality of Service) in the LPP (LTE positioning Protocol; LTE: Long Term Evolution) protocol. It should be noted that the LPP protocol may be applicable to a variety of networks, for example, the LPP protocol is used for both a 5G NR network and an LTE network, that is, the contents provided by the embodiments of the present disclosure is also applicable to the background to which the LPP protocol is applied.

The QoS requirement of the location service is defined in the LPP protocol, which is notified to the terminal by the LMF (Location Management Function) location server. The QoS contains the requirement for positioning accuracy, including the accuracy requirement for the horizontal location within a certain confidence interval (confidence) and the accuracy requirement for the vertical location within a certain confidence interval.

Figure 1:
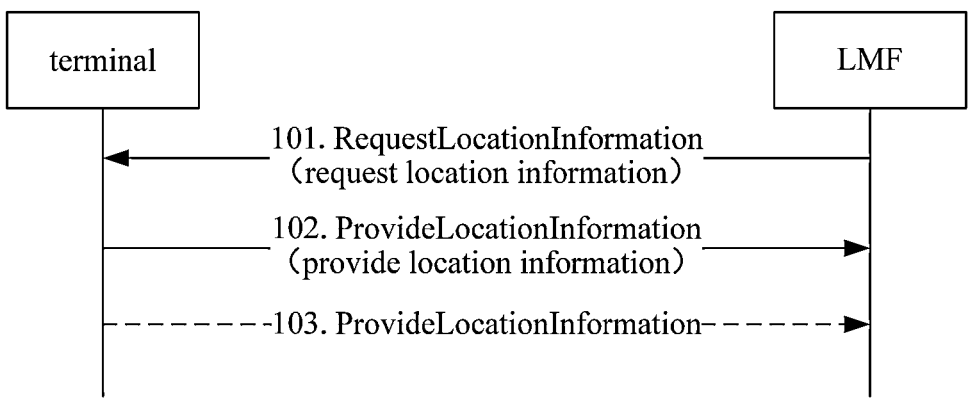
FIG. 1 is a schematic diagram of a location provision process in the related art.

FIG. 1 is a schematic diagram of a location provision process. As shown, for the network QoS mechanism, the existing process of providing a QoS requirement through LPP is as follows:

Step 101, based on a requested location service, the LMF broadcasts the QoS required by the corresponding location service to the terminal through a requestlocationinformation (request location information) message in the LPP protocol;

Step 102, the terminal receives the QoS index brought through the LPP message, and selects an appropriate positioning method according to the QoS requirement in the UE-Based (UE: User Equipment) scenario to meet the QoS index requirement. Finally, the terminal sends the calculated location to the network through providelocationinformation (providing location information), and indicates a deviation that satisfies the QoS index.

Step 103, the UE-Assisted terminal provides the network with the measurement amount through the providelocation-information in the auxiliary positioning measurement, so as to help the location server LMF to perform the location calculation.

The following is a brief description of the definition of the index of "integrity".

The index that the error of the location estimation is controlled within a certain range is the integrity index requirement, and usually there are the following types of parameters:

integrity horizontal location protection value (Horizon-talProtectionLevel):

indicating a horizontal location estimation error, and requires that a probability of the horizontal location estimation error greater than PL (location protection value, ProtectionLevel) should be lower than a value of a risk requirement Irisk, $P(\varepsilon > PL) < Irisk$.

Integrity vertical location protection value (VerticalPro-tectionLevel):

indicating an upper limit of a vertical location error, and requires that a probability of vertical location estimation error greater than PL should be lower than the value of the risk requirement Irisk, $P(\varepsilon > PL) < Irisk$.

Wherein, $\varepsilon$ is the actual location estimation error, and Irisk is defined as follows:

Integrity risk (Irisk):

the integrity risk refers to a probability that a location error exceeds a tolerance limit.

Horizontal location alert limit (Horizontal Alert Limit).

Vertical location alert limit (Vertical Alert Limit):

indicating the maximum allowable location (horizontal location and vertical location) estimation error when the system is able to function properly. The operation becomes dangerous if the location error exceeds the ProtectionLevel limit in any dimension or equivalent dimension. Therefore, when the system believes that the application becomes unavailable, it starts to alert, so as to protect the integrity from loss.

Horizontal location alert valid time (Horizontal Time to Alert);

Vertical location alert valid time (Vertical Time to Alert);

Reliability requirement indication (Authentication Flag), including multiple dimensions such as horizontal and vertical dimensions:

an indication requiring the service to support the integrity function.

The disadvantage of the related art is that, as mentioned above, there is no concept of location service integrity under the current 3GPP architecture. Under the current technology, the related art cannot address the situation in which the accuracy of the location service meets the QoS index requirement while sometimes a very large error occurs in the location estimation. In a location service scenario that affects the safety of life and property and will bring legal liability, if the location error is too large at one time, it may have a serious impact and cause bad consequences. Therefore, it is necessary to improve the relevant technical mechanisms, limit the occurrence of an extremely bad point, and avoid the occurrence of such incidents. Wherein, the extremely bad point of location estimation refers to: the distance between the calculated location and the real location exceeds the preset threshold T, which is called the extremely bad point. For example, if the value of the threshold T is 10 meters, the actual location is at point A, the calculated location is at point B, and the distance between point A and point B is greater than the threshold T of 10 meters; such a location is an extremely bad point, which will bring unexpected consequences. For example, when the automatic lifting equipment of the industrial IoT machine is working, economic losses or casualties will be caused due to the location error exceeding the preset threshold T.

That is, the existing positioning mechanism only satisfies the requirement of positioning accuracy, that is, the location service only supports the positioning accuracy that is satisfied within a certain confidence interval. The service quality requirement for integrity is not introduced. The "Integrity" is a capability of a positioning enhancement system, which is suitable for various scenarios that affect the safety of life and property and bring legal liability. Since 5G systems are oriented towards vertical industries, the location services based on mobile communication networks will be used in scenarios such as autonomous driving and industrial Internet of Things. In these scenarios, there are not only the requirement for positioning accuracy, but also further requirement for the range of location error.

After the integrity function is introduced, the terminal can be informed of the tolerable range of location errors for the location service according to the requirements of different scenarios, and the extremely bad points of these location estimations will be limited to avoid the loss of life and property caused by positioning system errors, and to avoid legal liability caused by location errors; when the risk exceeds the control range, the system will accurately and timely alert the user to fully protect the user's safety. If there is no index requirement for the integrity in the QoS in the location service, the terminal and the location server that calculate the location cannot obtain the index requirement supporting the integrity, and the integrity of the mobile communication network location service cannot be achieved. Based on this, the technical solutions provided in the embodiments of the present disclosure will solve the problem of how to set and feedback to meet the integrity QoS index requirement.

The specific implementations of the present disclosure will be described below with reference to the accompanying drawings.

In the descriptions, the implementations of the UE and the network side will be described respectively, and then an example of the coordinated implementation of the two will be given to better understand the implementation of the solutions provided in the embodiments of the present disclosure. Such an explanation does not mean that the two must be implemented together or must be implemented separately. In fact, when the UE and the network side are implemented separately, they also solve the problems on the UE side and the network side respectively, and when the two are used in combination, better technical effects will be obtained.

Figure 2:
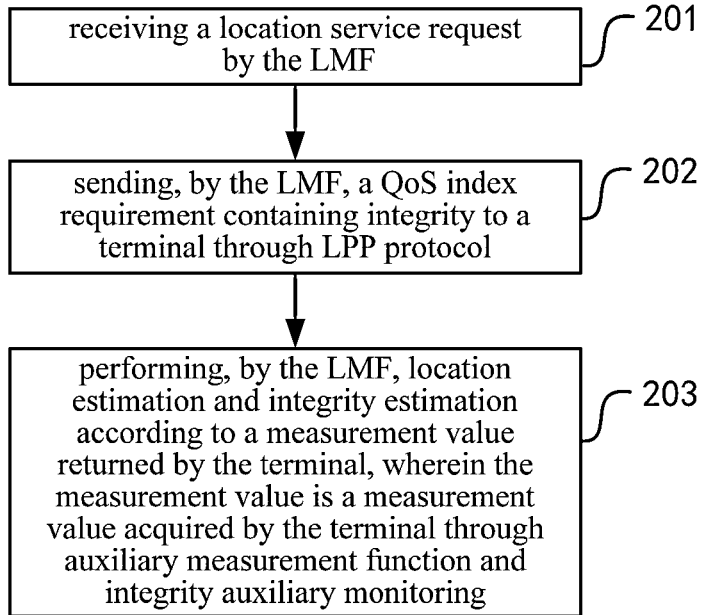
FIG. 2 is a schematic flowchart of implementing a method for location service processing on a network side in an embodiment of the present disclosure.

FIG. 2 is a schematic flowchart of implementing a method for location service processing on a network side, as shown, which may includes:

Step 201, LMF receiving a location service request;

Step 202, the LMF sending a QoS index requirement containing integrity to a terminal through LPP protocol; and Step 203, the LMF performing location estimation and integrity estimation according to a measurement value returned by the terminal, wherein the measurement value is a measurement value acquired by the terminal through auxiliary measurement function and integrity auxiliary monitoring.

FIG. 3 is a schematic flowchart of implementing a method for location service processing on a terminal side in an embodiment of the present disclosure, as shown, which includes:

Step 301, a terminal receiving a QoS index requirement containing integrity sent by LMF through LPP protocol;

Step 302, the terminal performing auxiliary measurement function and integrity auxiliary monitoring according to the QoS index requirement containing integrity, and then acquiring a measurement value;

Step 303, the terminal returning the measurement value to the LMF, wherein the measurement value is a measurement value acquired by the terminal through auxiliary measurement function and integrity auxiliary monitoring.

In some optional embodiments, the QoS index containing integrity includes one or a combination of the following information:

integrity risk requirement (Integrity risk, referred to as Irisk for short);

horizontal location alert limit (Horizontal Alert Limit);

vertical location alert limit (Vertical Alert Limit);

horizontal location alert valid time (Horizontal Time to Alert);

vertical location alert valid time (Vertical Time to Alert); and reliability requirement indication (Authentication Flag).

In the embodiments, the abbreviation AL (Alert Limit) is used to indicate the horizontal location alarm limit and the vertical location alarm limit; the abbreviation TTA (Time to Alert) is used to indicate the horizontal location alert valid time and the vertical location alert valid time.

Specifically, the integrity of the location service refers to a measure of the trust level of the location service. In the case that the system cannot meet the preset index requirement, it can provide a timely and effective alarm to a terminal user.

When initiating a location service request, the location server sends, according to the service type, the QoS index requirements containing integrity to the terminal through the LPP protocol. In the case of measurement, these QoS indexes can be applied to the location estimation of the location server. Assuming that the measurement is the only source of error, the server can perform location estimation from the measurement values provided by the target equipment.

After the terminal receives the integrity-related index requirement, it performs the integrity function in the processes of the auxiliary measurement and the location calculation, respectively, and finally realizes the integrity indexes of the QoS requirements.

The process will be described below.

In some optional embodiments, the QoS index requirement containing integrity is carried by LPP signaling RequestLocationInformation.

In some optional embodiments, the measurement value returned by the terminal is carried by LPP signaling ProvideLocationInformation.

In some optional embodiments, the QoS index requirement containing integrity is carried by a first message, and the measurement value returned by the terminal is carried by a second message.

In some optional embodiments, the first message may be the LPP signaling RequestLocationInformation, and the second message may be the LPP signaling ProvideLocationInformation.

It should be noted that the first message and the second message may be the same message or different messages, and may be carried in the same or different signaling. For example, the QoS index requirement containing integrity may be carried by the LPP signaling RequestLocationInformation or by another message; the measurement value returned by the terminal may be carried by the LPP signaling ProvideLocationInformation or by another message, which will not be limited in this application.

In some optional embodiments, the measurement value acquired through integrity auxiliary monitoring includes:

an integrity parameter value for a GNSS-dependent measurement component; and/or, an integrity parameter value for a RAT-dependent measurement component.

Specifically, after receiving the QoS service request, the UE provides an integrity monitoring indication through the LPP signaling ProvideLocationInformation, including but not limited to the following information:

integrity parameter values for the GNSS (Global Navigation Satellite System)-dependent measurement components: a multipath parameter value, an electromagnetic interference parameter value, a satellite fault parameter value, a pseudo-range correction integrity parameter value, a carrier phase integrity correction parameter value, etc.

integrity parameter values for the RAT-dependent (RAT: Radio Access Technology) measurement components: a network out-of-synchronization indication parameter value; a multipath indication parameter value, etc.

In some optional embodiments, in a case that the measurement value acquired by the terminal is unreliable, the measurement value further includes an integrity alert indication component for prompting a test component entering an unreliable state, wherein, whether it belongs to the unreliable state is determined according to an integrity index.

Accordingly, the measurement value received on the network side further includes the integrity alert indication component for prompting a test component entering an unreliable state, wherein, whether it belongs to the unreliable state is determined according to the integrity index.

Specifically, when the location server receives a location service request from a positioning client, it selects, according to the service type, a corresponding QoS index requirement, for example, including a positioning accuracy requirement and a positioning integrity index requirement.

When the UE receives the QoS parameter carried by the LPP signaling RequestLocationInformation from the server in the connected state, it reads the integrity-related requirement in the QoS. The integrity indication information carried in this message may be one or a parameter combination of the following information:

the integrity risk requirement;

the horizontal location alert limit;

the vertical location alert limit;

the horizontal location alert valid time;

the vertical location alert valid time; and the reliability requirement indication, including multiple dimensions such as horizontal and vertical dimensions.

After receiving the QoS service request, the UE provides an integrity monitoring indication through the LPP signaling ProvideLocationInformation.

In the case that the UE is capable of calculating the location estimation, it may provide the integrity satisfaction of the location estimation, and the integrity horizontal and vertical location protection values through LPP signaling ProvideLocationInformation, and feed the same back to the location server.

In some optional embodiments, in a case that the terminal supports the UE-Assisted capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; the network finally calculates and obtains the integrity protection value based on the measurement value reported by the terminal and the monitoring result of the network itself; and/or, in a case that the terminal supports the UE-based capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value, so that the integrity protection value is calculated and obtained according to the measurement value.

Specifically, in the stage of receiving the QoS and measuring, both a terminal supporting the UE-Assisted capability and a terminal supporting the UE-based capability need to acquire the QoS value, and provide the measurement value to the network. The difference is that the terminal supporting UE-based capability also needs to calculate the PL according to the QoS value, decide whether the system is reliable, and then send the result to the network.

Examples are given below for illustration.

Embodiment I

In this example, the terminal supports the UE-Assisted capability, and the terminal performs auxiliary measurement function and integrity auxiliary monitoring according to one or a combination of the integrity risk requirement Irisk, the horizontal location alert limit, the vertical location alert limit, the reliability requirement indication Authentication Flag, the horizontal location alert valid time, and the vertical location alert valid time in the QoS index requirement containing integrity, and then acquires a measurement value.

When the location server receives the location service request from the positioning client, it performs as follows:

1. The server LMF selects and sets the corresponding QoS index requirements, for example, including the positioning accuracy requirement and the positioning integrity index requirement, according to the service type.

2. The location server sends the QoS through the LPP signaling RequestLocationInformation, which carries the integrity-related requirement. The integrity indication information carried in this message may be one or a combination of the following information. Specifically, for example, it is required that the integrity horizontal location protection threshold should not exceed 1 meter, and the risk requirement should be controlled within 90%, which means that the positioning horizontal error cannot exceed 1 meter within a 90% probability. Once it exceeds 1 meter, the system becomes unreliable, i.e. the calculated location will be no longer employed.

The integrity risk requirement;
the horizontal location alert limit;
the vertical location alert limit;
the horizontal location alert valid time;
the vertical location alert valid time; and
the reliability requirement indication, including multiple dimensions such as horizontal and vertical dimensions.

3. When the UE supporting only the UE-Assisted capability receives the LPP signaling RequestLocationInformation from the server, it reads the integrity-related requirement in the QoS, and performs auxiliary measurement function and supports integrity auxiliary monitoring on the terminal side according to the parameters such as Irisk, AL, Authentication Flag, TTA, etc., in the QoS, combined with the auxiliary data and its integrity indication broadcasted by the network.

4. When the UE supporting only the UE-Assisted capability completes the integrity function monitoring and auxiliary measurement, it provides the integrity-related auxiliary measurement values to the network through the LPP protocol ProvideLocationInformation. For example, in a case that some signal or system of the auxiliary measurement is in an unreliable state, the measured value is unreliable. Therefore, when reporting the measured value, it also carries the integrity alert indication component, prompting the system which test components enters an unreliable state, and assists the network server in the location calculation and the calculation of the integrity PL.

In some optional embodiments, the PL is calculated by the UE or the LMF according to the measurement value, and does not need to be reflected in the QoS.

Embodiment II

In this example, the terminal supports the UE-based capability, and the terminal performs auxiliary measurement function and integrity auxiliary monitoring according to one or a combination of the location protection value PL, the integrity risk requirement Irisk, the horizontal location alert limit, the vertical location alert limit, the reliability requirement indication Authentication Flag in the QoS index requirement containing integrity, and then acquires a measurement value.

When the location server receives the location service request from the positioning client, it performs as follows:

1. The server LMF selects and sets the corresponding QoS index requirements, for example, including the positioning accuracy requirement and the positioning integrity index requirement, according to the service type.

2. The location server sends the QoS through the LPP signaling RequestLocationInformation, which carries the integrity-related requirement. The integrity indication information carried in this message may be one or a combination of the following information. Specifically, for example, the Authentication Flag indicates that integrity protection is required, the risk requirement is controlled within 99.9%, the horizontal alert limit is 0.16 meters, and the vertical alarm limit is 0.08 meters, which means that in 99.9% of the measurement points, the location error of the horizontal location cannot exceed 0.2 meters, and the vertical error cannot exceed 0.1 meters. Once the duration of the horizontal error exceeds the horizontal location alert valid time Time to Alert, and the duration of the vertical error exceeds the vertical location alert valid time Time to Alert, the system will be unreliable, that is, the calculated location cannot be employed. If the calculated horizontal location error exceeds the horizontal location alert limit by 0.16 meters within the TTA time, or if the vertical location error exceeds the alert limit by 0.08 meters within the TTA time, it means that the system has reached the critical point, and the terminal will give an alert through the error.

The integrity risk requirement;
the horizontal location alert limit;
the vertical location alert limit;
the horizontal location alert valid time;
the vertical location alert valid time; and
the reliability requirement indication.

3. When the UE supporting the UE-based capability receives the LPP signaling RequestLocationInformation from the server in the connected state, it reads the integrity-related requirement in the QoS, including the parameters such as PL, Irisk, AL, Authentication Flag, etc., in the QoS, and further reads the auxiliary data broadcasted by the network. On the terminal side, the terminal first selects the positioning method according to the QoS requirement, and then performs auxiliary measurement function according to the corresponding method; and performs integrity auxiliary monitoring according to the integrity requirement flag carried by the QoS.

4. When the UE supporting the UE-based capability completes the location calculation, the calculation of the integrity horizontal location protection value calculation and the calculation of the integrity vertical location protection value, the terminal compares the calculated result PL with the received QoS integrity parameter AL requirement. If the PL value exceeds the AL within the TTA time, it is considered that the UE location calculation is no longer reliable at this time. For example, the calculated horizontal location error exceeds the horizontal location alert limit by 0.16 meters within the TTA time, or the vertical location error exceeds the alert limit by 0.08 meters within the TTA time, it means that the system has reached the critical point, and the terminal will notify the server in this message that this calculated location estimation is not reliable. Then the UE will send the calculated location information to the LMF through the ProvideLocationInformation message in the LPP signaling, and at the same time feed back the integrity satisfaction feedback in this message to indicate that the integrity horizontal and vertical location protection values corresponding to the calculated location this time exceed the specified limits, and indicate that the current terminal positioning system is no longer reliable, and report the calculated integrity protection value PL.

Embodiment III

In this example, the terminal supports the UE-Assisted capability, and the terminal performs auxiliary measurement function and integrity auxiliary monitoring according to one or a combination of the integrity risk requirement Irisk, the horizontal location alert limit, the vertical location alert limit, the reliability requirement indication Authentication Flag, the horizontal location alert valid time, and the vertical location alert valid time in the QoS index requirement containing integrity, and then acquires a measurement value.

The integrity-related auxiliary measurement values by the terminal includes the integrity parameter values for the GNSS-dependent measurement components.

When the location server receives the location service request from the positioning client, it performs as follows:

1. The server LMF selects and sets the corresponding QoS index requirements, for example, including the positioning accuracy requirement and the positioning integrity index requirement, according to the service type.

2. The location server sends the QoS through the LPP signaling RequestLocationInformation, which carries the integrity-related requirement. The integrity indication information carried in this message may be one or a combination of the following information, for example, it is required that the integrity horizontal location protection threshold should not exceed 1 meter, and the risk requirement should be controlled within 90%, which means that the positioning horizontal error cannot exceed 1 meter within a 90% probability. Once it exceeds 1 meter, the system becomes unreliable, i.e. the calculated location will be no longer employed.

The integrity risk requirement;
the horizontal location alert limit;
the vertical location alert limit;
the horizontal location alert valid time;
the vertical location alert valid time; and
the reliability requirement indication, including multiple dimensions such as horizontal and vertical dimensions.

3. When the UE supporting only the UE-Assisted capability receives the LPP signaling RequestLocationInformation from the server, it reads the integrity-related requirement in the QoS, and performs auxiliary measurement function and supports integrity auxiliary monitoring on the terminal side according to the parameters such as Authentication Flag, TTA, etc., in the QoS, combined with the auxiliary data and its integrity indication broadcasted by the network.

4. When the UE supporting only the UE-Assisted capability performs the GNSS positioning method under the request of RequestLocationInformation, and completes the related integrity function monitoring and auxiliary measurement, it provides the integrity-related auxiliary measurement values to the network through the LPP protocol ProvideLocationInformation, which include one or a combination of the following information:

the integrity parameter values for the GNSS-dependent measurement components: a multipath parameter value, an electromagnetic interference parameter value, a satellite fault parameter value, a pseudo-range correction integrity parameter value, and a carrier phase integrity correction parameter value.

5. The UE provides the measurement component related to the GNSS positioning method through the ProvideLocationInformation, and the measurement component is one or a combination of the following information:

a multipath integrity measurement value, an electromagnetic interference integrity measurement value, a satellite fault measurement value, a pseudo-range correction integrity measurement value, and a carrier phase integrity measurement value.

When the LMF receives the measurement value, it performs weighted calculation in combination with other GNSS integrity components to obtain the integrity PL value of the terminal, and compares it with the AL to obtain the result of whether the GNSS system positioning is reliable.

Embodiment IV

In this example, the terminal supports the UE-based capability, and the terminal performs auxiliary measurement function and integrity auxiliary monitoring according to one or a combination of the location protection value PL, the integrity risk requirement Irisk, the horizontal location alert limit, the vertical location alert limit, the reliability requirement indication Authentication Flag in the QoS index requirement containing integrity, and then acquires a measurement value.

The integrity-related auxiliary measurement values by the terminal includes the integrity parameter values for the RAT-dependent measurement components: a network out-of-synchronization indication parameter value; a multipath indication parameter value.

When the location server receives the location service request from the positioning client, it performs as follows:

1. The server LMF selects and sets the corresponding QoS index requirements, for example, including the positioning accuracy requirement and the positioning integrity index requirement, according to the service type.

2. The location server sends the QoS through the LPP signaling RequestLocationInformation, which carries the integrity-related requirement. The integrity indication information carried in this message may be one or a combination of the following information, for example, it is required that the integrity horizontal location protection threshold should not exceed 1 meter, and the risk requirement should be controlled within 90%, which means that the positioning horizontal error cannot exceed 1 meter within a 90% probability. Once it exceeds 1 meter, the system becomes unreliable, i.e. the calculated location will be no longer employed.

The integrity risk requirement;
the horizontal location alert limit;
the vertical location alert limit;
the horizontal location alert valid time;
the vertical location alert valid time; and
the reliability requirement indication, including multiple dimensions such as horizontal and vertical dimensions.

3. When the UE supporting only the UE-based capability receives the LPP signaling RequestLocationInformation from the server, it reads the rintegrity-related requirement in the QoS, and performs auxiliary measurement function and supports integrity auxiliary monitoring on the terminal side according to the parameters such as Authentication Flag, TTA, etc., in the QoS, combined with the auxiliary data and its integrity indication broadcasted by the network.

4. When the UE supporting only the UE-based capability performs the RAT-dependent downlink positioning method under the request of RequestLocationInformation, and completes the related integrity function monitoring and auxiliary measurement such as the DL-TDOA, it provides the integrity-related auxiliary measurement values to the network through the LPP protocol ProvideLocationInformation, which include one or a combination of the following information: a network out-of-synchronization indication parameter value; a multipath indication parameter value.

5. When the LMF receives the component related to the RAT-dependent downlink positioning method, it performs weighted calculation in combination with the integrity monitoring component reported by the base station to obtain the integrity PL value of the terminal, and compares it with the AL to obtain the result of whether the RAT-dependent downlink positioning is reliable.

Based on the same inventive concept, the embodiments of the present disclosure also provide an LMF, a terminal, a device for location service processing, and a medium. Since the principle of these devices for solving problems is similar to the method for location service processing, the implementation of these devices can refer to the implementation of the method, which will not be repeated here.

When implementing the technical solutions provided by the embodiments of the present disclosure, they can be implemented as follows.

FIG. 4 is a schematic structural diagram of an LMF. As shown, the LMF includes:

a processor 400 for reading a program in a memory 420 and executing following processes:

receiving a location service request;

sending a QoS index requirement containing integrity to a terminal through LPP protocol; and performing location estimation and integrity estimation according to a measurement value returned by the terminal, wherein the measurement value is a measurement value acquired by the terminal through auxiliary measurement function and integrity auxiliary monitoring; and a transceiver 410 for receiving and sending data under control of the processor 400.

In some optional embodiments, the QoS index requirement containing integrity is carried by the LPP signaling RequestLocationInformation.

In some optional embodiments, the measurement value returned by the terminal is carried by LPP signaling ProvideLocationInformation.

In some optional embodiments, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

the integrity parameter value for the GNSS-dependent measurement component; and/or, the integrity parameter value for the RAT-dependent measurement component.

In some optional embodiments, the QoS index requirement containing integrity includes one or a combination of following information:

the integrity risk requirement;

the horizontal location alert limit;

the vertical location alert limit;

the horizontal location alert valid time;

the vertical location alert valid time; and the reliability requirement indication.

In FIG. 4, the bus architecture may include any number of interconnected buses and bridges, which are linked together specifically by various circuits such as one or more processors represented by the processor 400 and the storage represented by the memory 420. The bus architecture can also link various other circuits such as peripheral devices, voltage regulators, and power management circuits, etc., which are well known in the art, and therefore, they will not be further described herein. The bus interface provides interfaces. The transceiver 410 may be a plurality of elements, including a transmitter and a receiver, and provides units for communicating with various other devices on a transmission medium. The processor 400 is responsible for managing the bus architecture and general processing, and the memory 420 may store data used by the processor 400 when performing operations.

An embodiment of the present disclosure provides a device for location service processing on the LMF side, which will be described below.

FIG. 5 is a schematic structural diagram of the device for location service processing on the LMF side, as shown, it may include:

a request reception module 501 configured to receive a location service request;

an index sending module 502 configured to sending a QoS index requirement containing integrity to a terminal through LPP protocol;

an estimation module 503 configured to perform location estimation and integrity estimation according to a measurement value returned by the terminal, wherein the measurement value is a measurement value acquired by the terminal through auxiliary measurement function and integrity auxiliary monitoring.

In some optional embodiments, the index sending module is further configured to carry the QoS index requirement containing integrity through the LPP signaling RequestLocationInformation.

In some optional embodiments, the measurement value returned by the terminal is carried by LPP signaling ProvideLocationInformation.

In some optional embodiments, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity incudes one or a combination of following information:

integrity risk requirement;

horizontal location alert limit;

vertical location alert limit;

horizontal location alert valid time;

vertical location alert valid time; and reliability requirement indication.

For the convenience of description, the parts of the device described above are divided into various modules or units according to their functions and described respectively. Obviously, when implementing the present disclosure, the functions of the modules or units may be implemented in one or more software or hardware.

Figure 6:
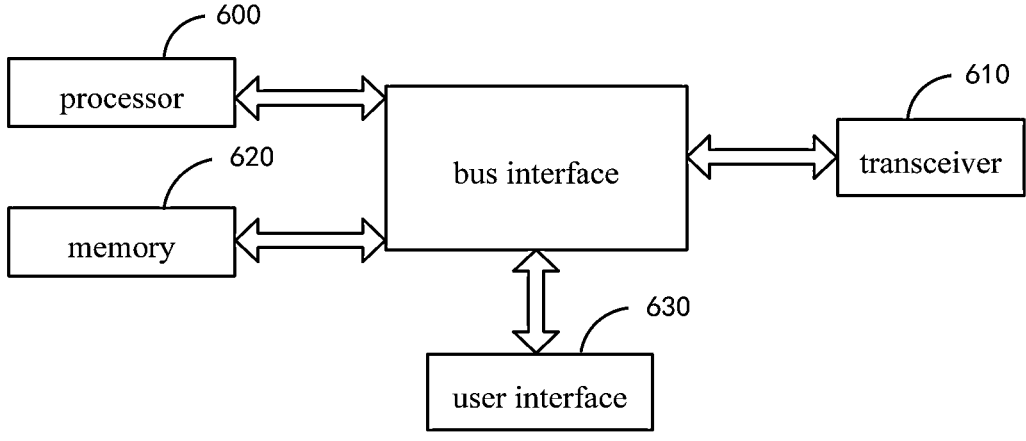
FIG. 6 is a schematic structural diagram of a terminal in an embodiment of the present disclosure.

FIG. 6 is a schematic structural diagram of a terminal. As shown, the user equipment includes:

a processor 600 configured to read a program in a memory 620 and execute following processes:

receiving a QoS index requirement containing integrity sent by LMF through LPP protocol;

performing auxiliary measurement function and integrity auxiliary monitoring according to the QoS index requirement containing integrity, and then acquiring a measurement value; and returning the measurement value to the LMF, wherein the measurement value is a measurement value acquired by the terminal through auxiliary measurement function and integrity auxiliary monitoring; and a transceiver 610 configured to receive and send data under the control of the processor 600.

In some optional embodiments, the QoS index requirement containing integrity is carried by LPP signaling RequestLocationInformation.

In some optional embodiments, the measurement value returned by the terminal is carried by LPP signaling ProvideLocationInformation.

In some optional embodiments, in a case that the measurement value acquired by the terminal is unreliable, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity includes one or a combination of following information:

integrity risk requirement;

horizontal location alert limit;

vertical location alert limit;

horizontal location alert valid time;

vertical location alert valid time; and reliability requirement indication.

In some optional embodiments, in a case that the terminal supports a UE-Assisted capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; and/or, in a case that the terminal supports a UE-based capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value.

In FIG. 6, the bus architecture may include any number of interconnected buses and bridges, which are linked together specifically by various circuits such as one or more processors represented by the processor 600 and the storage represented by the memory 620. The bus architecture can also link various other circuits such as peripheral devices, voltage regulators, and power management circuits, etc., which are well known in the art, and therefore, they will not be further described herein. The bus interface provides interfaces. The transceiver 610 may be a plurality of elements, including a transmitter and a receiver, and provides units for communicating with various other devices on a transmission medium. For different user equipments, the user interface 630 may also be an interface capable of connecting the required devices externally and internally, and the connected devices includes but is not limited to a keypad, a display, a speaker, a microphone, a joystick, and the like.

The processor 600 is responsible for managing the bus architecture and general processing, and the memory 620 may store data used by the processor 600 when performing operations.

An embodiment of the present disclosure provides a device for location service processing on the terminal side, which will be described below.

Figure 7:
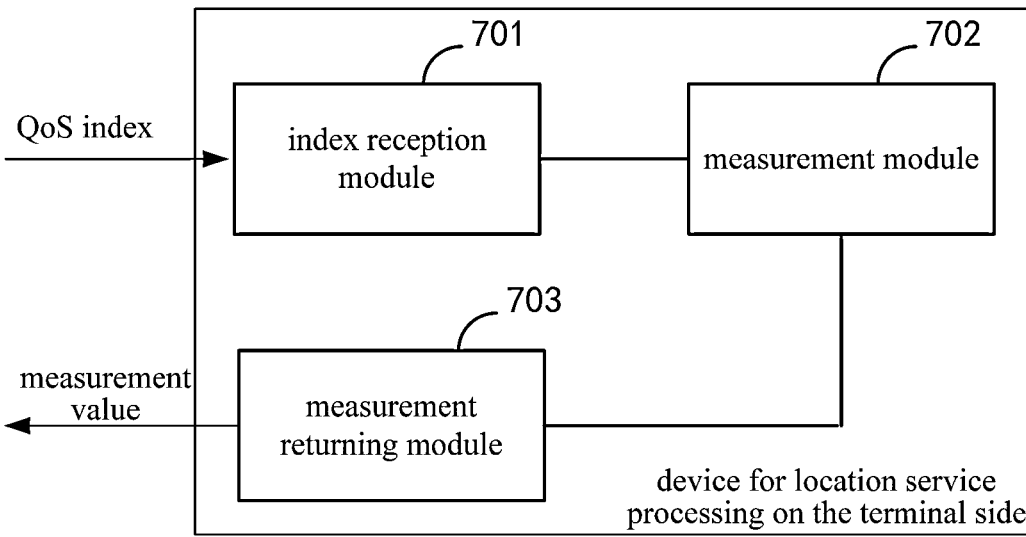
FIG. 7 is a schematic structural diagram of a device for location service processing on a terminal side in an embodiment of the present disclosure.

FIG. 7 is a schematic structural diagram of the device for location service processing on the terminal side, as shown, it may include:

an index reception module 701 configured to receive a QoS index requirement containing integrity sent by LMF through LPP protocol;

a measurement module 702 configured to perform auxiliary measurement function and integrity auxiliary monitoring according to the QoS index requirement containing integrity, and then acquiring a measurement value; and a measurement value returning module 703 configured to return the measurement value to the LMF, wherein the measurement value is a measurement value acquired by the terminal through auxiliary measurement function and integrity auxiliary monitoring.

In some optional embodiments, the index sending module is further configured to carry the QoS index requirement containing integrity through the LPP signaling RequestLocationInformation.

In some optional embodiments, the measurement value returned by the terminal is carried by LPP signaling ProvideLocationInformation.

In some optional embodiments, in a case that the measurement value acquired by the terminal is unreliable, the measurement value further includes an integrity alert indication component for prompting a test component entering an unreliable state, wherein, whether it belongs to the unreliable state is determined according to an integrity index.

In some optional embodiments, the measurement value acquired through integrity auxiliary monitoring includes:

an integrity parameter value for a GNSS-dependent measurement component; and/or, an integrity parameter value for a RAT-dependent measurement component.

In some optional embodiments, the QoS index requirement containing integrity includes one or a combination of following information:

integrity risk requirement;

horizontal location alert limit;

vertical location alert limit;

horizontal location alert valid time;

vertical location alert valid time; and reliability requirement indication.

In some optional embodiments, in a case that the terminal supports a UE-Assisted capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; and/or, in a case that the terminal supports a UE-based capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value.

For the convenience of description, the parts of the device described above are divided into various modules or units according to their functions and described respectively. Obviously, when implementing the present disclosure, the functions of the modules or units may be implemented in one or more software or hardware.

An embodiment of the present disclosure provides a computer readable storage medium storing a program for performing any of the aforementioned methods for location service processing.

For specific implementations, reference may be made to the embodiments of the method for location service processing on the LMF side and/or the method for location service processing on the terminal side.

To sum up, in the technical solutions provided by the embodiments of the present disclosure, the QoS parameters issued by the network to the terminal through the LPP signaling contain the requirements for the integrity parameters; the UE-Assisted terminal feeds back the auxiliary measurement value and the carried integrity monitoring result to the network through the LPP signaling, and the UE-based terminal feeds back the location estimation integrity protection value, and the index satisfaction indication, including the indication that the calculated location is invalid or is about to be invalid, to the network through the LPP signaling.

Since the terminal can be notified that the integrity is required to be satisfied, the NR terminal can obtain the location service integrity requirements provided (required) by the network side in time. The terminal will also feed back to the network whether the integrity requirements are met.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the present disclosure may take the form of a computer program product implemented on one or more computer-usable storage media (including but not limited to disk storage and optical storage, etc.) containing computer-usable program codes therein.

The present disclosure is described with reference to flowcharts and/or block diagrams of methods, devices (systems), and program products according to the embodiments of the present disclosure. It will be appreciated that each process and/or block in the flowcharts and/or block diagrams, and combinations of processes and blocks in the flowcharts and block diagrams may be implemented by program instructions. These program instructions may be provided to a processor of a general purpose computer, special purpose computer, embedded processor, or other programmable data processing devices to produce a machine, such that the instructions executed by the processor of the computer or other programmable data processing devices generate means for implementing the functions specified in one or more of the processes in the flowcharts and/or one or more of the blocks in the block diagrams.

These program instructions may also be stored in a computer readable storage capable of guiding a computer or other programmable data processing devices to work in a specific manner, such that the instructions stored in the computer readable storage produce a manufactured article including the instruction means which implements the functions specified in one or more of the processes in the flowcharts and/or one or more of the blocks in the block diagrams.

These computer program instructions may also be loaded on a computer or other programmable data processing devices, so that a series of operation steps can be performed on the computer or other programmable devices to produce computer-implemented processing, so that the instructions executed on the computer or other programmable devices provide the steps for implementing the functions specified in one or more of the processes in the flowcharts and/or one or more of the blocks in the block diagrams.

It will be appreciated that the embodiments described in the embodiments of the present disclosure may be implemented by hardware, software, firmware, middleware, microcode, or a combination thereof. For hardware implementation, each module, unit, sub-unit or sub-module, etc. can be implemented in one or more Application Specific Integrated Circuits (ASICs), Digital Signal Processings (DSPs), DSP Devices (DSPDs), Programmable Logic Devices (PLDs), Field-Programmable Gate Arrays (FP-GAs), general-purpose processors, controllers, microcontrollers, microprocessors, other electronic units or combinations thereof that perform the functions described in this disclosure.

For software implementation, the technologies described in the embodiments of the present disclosure may be implemented through modules (e.g., procedures, functions, etc.) that perform the functions described in the embodiments of the present disclosure. Software codes may be stored in a storage and executed by a processor. The storage may be implemented in or external to the processor.

Obviously, those skilled in the art can make various modifications and variations to the embodiments of the present disclosure without departing from the spirit and scope of the present disclosure. Thus, if these modifications and variations of the embodiments of the present disclosure fall within the scope of the claims of the present disclosure and their equivalent technologies, the present disclosure also intends to include these modifications and variations.

What is claimed is:

1. A method for location service processing, comprising:
   receiving a location service request by a Location Management Function (LMF);
   sending, by the LMF, a Quality of Service (QOS) index requirement containing integrity to a terminal through LTE positioning Protocol (LPP); and
   performing, by the LMF, location estimation and integrity estimation according to a measurement value returned by the terminal, wherein the measurement value comprises at least one of a measurement value acquired through auxiliary measurement function and a measurement value acquired through integrity auxiliary monitoring;
   wherein the QoS index requirement containing integrity comprises one or a combination of following information:
   integrity risk requirement;
   horizontal location alert limit;
   vertical location alert limit;
   horizontal location alert valid time;
   vertical location alert valid time; and
   reliability requirement indication.

2. The method according to claim 1, wherein sending, by the LMF, a Quality of Service (QOS) index requirement containing integrity to a terminal through LTE positioning Protocol (LPP), comprises:

sending, by the LMF, LPP signaling RequestLocationInformation to the terminal;

the QoS index requirement containing integrity is carried in the LPP signaling RequestLocationInformation; and/or, the method further comprises:

receiving, by the LMF, the measurement value returned by the terminal which is carried by LPP signaling ProvideLocationInformation.

3. The method according to claim 1, wherein the measurement value further comprises an integrity alert indication component, the integrity alert indication component is provided for prompting a test component entering an unreliable state, wherein, the unreliable state is determined according to an integrity index.

4. The method according to claim 1, wherein the measurement value acquired through integrity auxiliary monitoring comprises:

an integrity parameter value for a Global Navigation Satellite System (GNSS)-dependent measurement component; and/or, an integrity parameter value for a Radio Access Technology-Dependent (RAT-dependent) measurement component.

5. A method for location service processing, comprising:

receiving, by a terminal, a QoS index requirement containing integrity sent by LMF through LPP protocol;

performing, by the terminal, auxiliary measurement function and/or integrity auxiliary monitoring according to the QOS index requirement containing integrity, and then acquiring a measurement value; and returning, by the terminal, the measurement value to the LMF;

wherein the QoS index requirement containing integrity comprises one or a combination of following information:

integrity risk requirement;

horizontal location alert limit;

vertical location alert limit:

horizontal location alert valid time;

vertical location alert valid time; and reliability requirement indication.

6. The method according to claim 5, wherein the receiving, by a terminal, a QoS index requirement containing integrity sent by LMF through LPP protocol, comprises:

receiving, by the terminal, LPP signaling RequestLocationInformation, the QoS index requirement containing integrity is carried by the LPP signaling RequestLocationInformation; and/or, returning, by the terminal, the measurement value comprises:

sending, by the terminal, the LPP signaling ProvideLocationInformation carrying the measurement value to the LMF.

7. The method according to claim 5, wherein, in a case that the measurement value acquired by the terminal is unreliable, the measurement value comprises an integrity alert indication component, the integrity alert indication component is provided for prompting a test component entering an unreliable state, wherein, the unreliable state is determined according to an integrity index.

8. The method according to claim 5, wherein the measurement value acquired through integrity auxiliary monitoring comprises:

an integrity parameter value for a GNSS-dependent measurement component; and/or, an integrity parameter value for a RAT-dependent measurement component.

9. The method according to claim 5, wherein, in a case that the terminal supports a User Equipment-Assisted (UE-Assisted) capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; and/or, in a case that the terminal supports a User Equipment-based (UE-based) capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value.

10. A terminal, comprising:

a processor configured to read a program in a memory and perform the method of claim 5; and a transceiver configured to receive and send data under control of the processor.

11. The terminal according to claim 10, wherein the receiving a QoS index requirement containing integrity sent by LMF through LPP protocol comprises:

receiving, by the terminal, LPP signaling RequestLocationInformation, the QoS index requirement containing integrity is carried by the LPP signaling RequestLocationInformation; and/or, returning, by the terminal, the measurement value comprises:

sending, by the terminal, the LPP signaling ProvideLocationInformation carrying the measurement value to the LMF.

12. The terminal according to claim 10, wherein, in a case that the measurement value acquired by the terminal is unreliable, the measurement value further comprises an integrity alert indication component, the integrity alert indication component is provided for prompting a test component entering an unreliable state, wherein, the unreliable state is determined according to an integrity index; and/or, wherein the measurement value acquired through integrity auxiliary monitoring comprises:

an integrity parameter value for a GNSS-dependent measurement component; and/or, an integrity parameter value for a RAT-dependent measurement component.

13. The terminal according to claim 10, wherein, in a case that the terminal supports a UE-Assisted capability, the terminal performs auxiliary measurement function and integrity auxiliary monitoring according to one or a combination of the integrity risk requirement, the horizontal location alert limit, the vertical location alert limit, the reliability requirement indication, the horizontal location alert valid time, and the vertical location alert valid time in the QoS index requirement containing integrity, and then acquires a measurement value; and/or, in a case that the terminal supports a UE-based capability, the terminal performs auxiliary measurement function and integrity auxiliary monitoring according to one or a combination of the integrity risk requirement, the horizontal location alert limit, the vertical location alert limit, and the reliability requirement indication in the QoS index requirement containing integrity, and then acquires a measurement value.

14. An LMF, comprising:

a processor configured to read a program in a memory and execute following processes:

receiving a location service request;

sending a QoS index requirement containing integrity to a terminal through LPP protocol; and performing location estimation and integrity estimation according to a measurement value returned by the terminal, wherein the measurement value comprises at least one of a measurement value acquired through auxiliary measurement function and a measurement value acquired through integrity auxiliary monitoring; and a transceiver configured to receive and send data under control of the processor;

wherein the QoS index requirement containing integrity comprises one or a combination of following information:

integrity risk requirement;

horizontal location alert limit;

vertical location alert limit;

horizontal location alert valid time;

vertical location alert valid time; and reliability requirement indication.

15. The LMF according to claim 14, wherein sending, by the LMF, a Quality of Service (QOS) index requirement containing integrity to a terminal through LTE positioning Protocol (LPP), comprises:

sending, by the LMF, LPP signaling RequestLocationInformation to the terminal;

the QoS index requirement containing integrity is carried in the LPP signaling RequestLocationInformation; and/or, the processor is further configured to execute following processes:

receiving, by the LMF, the measurement value returned by the terminal which is carried by LPP signaling ProvideLocationInformation.

16. The LMF according to claim 14, wherein the measurement value further comprises an integrity alert indication component, the integrity alert indication component is provided for prompting a test component entering an unreliable state, wherein, the unreliable state is determined according to an integrity index;

and/or, wherein the measurement value acquired through integrity auxiliary monitoring comprises:

an integrity parameter value for a GNSS-dependent measurement component; and/or, an integrity parameter value for a RAT-dependent measurement component.

* * * * *